United States Patent
Choi et al.

(10) Patent No.: US 8,698,606 B2
(45) Date of Patent: Apr. 15, 2014

(54) DIGITAL PRICE DISPLAYER AND ESL SYSTEM COMPRISING THE SAME

(75) Inventors: Jaeyeon Choi, Seoul (KR); Yongtaek Oh, Seoul (KR); Jubong Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 627 days.

(21) Appl. No.: 12/913,444

(22) Filed: Oct. 27, 2010

(65) Prior Publication Data

US 2011/0102155 A1    May 5, 2011

(30) Foreign Application Priority Data

Oct. 28, 2009   (KR) .................. 10-2009-0102737
Nov. 9, 2009    (KR) .................. 10-2009-0107735

(51) Int. Cl.
*G05B 23/02*    (2006.01)

(52) U.S. Cl.
USPC ............................................. 340/10.6

(58) Field of Classification Search
USPC ............... 340/10.6, 12.54; 235/375; 345/1.1; 705/20
See application file for complete search history.

(56) References Cited

U.S. PATENT DOCUMENTS

| | | | | |
|---|---|---|---|---|
| 5,715,622 A | * | 2/1998 | Giordano, Jr. | 40/661.03 |
| 7,152,040 B1 | * | 12/2006 | Hawthorne et al. | 705/16 |
| 7,598,925 B2 | * | 10/2009 | Koyama et al. | 345/1.1 |
| 2003/0164694 A1 | * | 9/2003 | Moseneder et al. | 320/165 |

\* cited by examiner

*Primary Examiner* — Vernal Brown
(74) *Attorney, Agent, or Firm* — Saliwanchik, Lloyd & Eisenschenk (57) ABSTRACT

A digital price displayer and an ESL system comprising the same are provided. The displayer includes a power supplier mounted on a product-displayed shelf for supplying a power; a display main body attachable to and detachable from the shelf and receiving power supplied from the power supplier, and outputting a price, a specification and an advertisement image of a product displayed on the shelf; an accommodator provided at the shelf, formed at one side with an anode and formed at the other side with a cathode for the display main body to be electrically connected to the power supplier if the display main body is fixed to the accommodator; and a coupler provided at the display main body to be slidingly coupled with the accommodator for electrical connection with the anode and the cathode and to prevent from being separated from the accommodator.

13 Claims, 10 Drawing Sheets

DIGITAL PRICE DISPLAYER AND ESL SYSTEM COMPRISING THE SAME

CROSS-REFERENCE TO RELATED APPLICATIONS

This application claims the benefit under 35 U.S.C. §119 of Korean Patent Application Nos. 10-2009-0102737, filed Oct. 28, 2009 and 10-2009-0107735, filed Nov. 9, 2009, which are hereby incorporated by reference in their entirety.

BACKGROUND OF THE DISCLOSURE

1. Field of the Invention

The present disclosure relates to a digital price displayer, and more particularly to a digital price displayer capable of displaying prices and specifications of products in real time, and conveniently inputting merchandise information, and an electronic shelf label (ESL) system comprising the same.

2. Description of the Related Art

Recently, stores such as department stores and convenient stores display a large variety of products on a shelf concomitant with development in distribution and logistics, where the shelf is mounted with a price display unit for displaying prices and information on products exhibited on the shelf.

The price display unit is formed in such a manner that a plate is fixed on a shelf, and the plate is attachably and detachably installed with a display panel provided with a display area on which a unit price, a country of origin, characteristic and a promotional information, etc., are shown.

However, most of the conventional price display units are disadvantageous in that the plate is fixed at a certain position, and it is cumbersome for a store manager to change the position of the plate where necessary. Another disadvantage is that the display panel is attachable and detachable to allow a customer to inadvertently or by mistake drop or separate the display panel from the plate to the fear of losing the display panel.

Still another disadvantage is that waste of materials is excessive because of disposal of the conventional price display unit if sales of products are not realized due to price changes or out of stock of products, as the display panels mounted at the plate must be differently manufactured according to the exhibited products to expresses a variety of shapes, colors and characters by one model of the display panel.

Meanwhile, large discount stores use a price display plate configured to display information and prices on products that are displayed. The conventional price display plate is inconvenient in its manual product information input method to decrease efficiency in product information input process, because a user must manually describe each product name and price on the price display plate or insert a board described with the product names and prices.

As a way of removing inconveniences involved in the conventional product information input method, a digital price displayer using an electronic display device has emerged. The digital price displayer is to display information and price of an exhibited product on a display device such as LCD (Liquid Crystal Display) capable of displaying desired information.

The digital price displayer may enhance the efficiency of product information input work by inputting information to be displayed using a keyboard, dispensing with a mechanical work of inserting a board or writing the information using a writing instrument. It is still cumbersome for a user to personally input the information in the digital price displayer.

BRIEF SUMMARY

The present disclosure has been made in view of the foregoing problems, and it is a first object of the present disclosure to provide a digital price displayer configured to allow a store manager to easily grasp stocks and sales status of products and to easily attach to or detach from a shelf on which products are displayed, whereas customers have difficulty in separating from the shelf.

Furthermore, it is a second object of the present disclosure to provide a digital price displayer configured to relieve a user from cumbersomeness of personally inputting merchandise information, thereby enabling the user to efficiently perform a merchandise information input operation.

It is a third object of the present disclosure to provide an ESL (Electronic Shelf Label) system including a digital price displayer configured to conveniently input merchandise information.

Technical subjects to be solved by the present disclosure are not restricted to the above-mentioned description, and any other technical problems not mentioned so far will be clearly appreciated from the following description by the skilled in the art.

In one general aspect of the present disclosure, a digital price displayer is provided, the displayer comprising: a power supplier mounted on a product-displayed shelf for supplying a power; a display main body attachable to and detachable from the shelf and receiving power supplied from the power supplier, and outputting a price, a specification and an advertisement image of a product displayed on the shelf; an accommodator provided at the shelf, formed at one side with an anode and formed at the other side with a cathode for the display main body to be electrically connected to the power supplier if the display main body is fixed to the accommodator; and a coupler provided at the display main body to be slidingly coupled with the accommodator for electrical connection with the anode and the cathode and to prevent from being separated from the accommodator.

In some exemplary embodiments of the present disclosure, the shelf may be installed with a fence to fix the display main body as the coupler is coupled to the accommodator, wherein the accommodator is formed lengthwise of the fence.

In some exemplary embodiments of the present disclosure, the power supplier may include a charger electrically connecting the anode, the cathode and an outside power line, and an overload preventing circuit installed between the outside power line and the charger to prevent the charger from being damaged by overload.

In some exemplary embodiments of the present disclosure, the displayer may further include a DC adapter between the overload preventing circuit and the outside power line to convert an AC (Alternating Current) supplied from the outside power line to a DC (Direct Current).

In some exemplary embodiments of the present disclosure, the display main body may receive the price, the specification and the advertisement image of the product displayed on the shelf from a sever via a wired network or a wireless network.

In some exemplary embodiments of the present disclosure, the display main body may include a body fixed at the shelf, a display module embedded in the body to change and output the price, the specification and the advertisement image of the product displayed on the shelf, a communication module embedded in the body to communicate with the server via a wired network or a wireless network, an MPU (Micro Processor Unit) embedded in the body to control a screen output of the display module and communication with the communication module, and a charger embedded in the body to supply a power for driving the display module, the communication module and the MPU.

In some exemplary embodiments of the present disclosure, the accommodator may be a slit-shaped rail or a plurality of holes, where the rail or the holes are provided at one side with an anode and at the other side with a cathode along a lengthwise direction of the fence.

In some exemplary embodiments of the present disclosure, the coupler may include a pin-shaped first piece accommodated into the accommodator, second pieces each discretely formed at each side of the first piece to correspond to a width of the accommodator to allow an elastic deformation and an elastic restoration, a first hook provided at a distal end of the second piece to be slidingly hitched by the accommodator and to prevent the display main body from being separated, wherein an outside of the second piece is provided with an electrode terminal contacting the anode and the cathode to be electrically connected to the power supplier.

In some exemplary embodiments of the present disclosure, the first hook may be formed with a slope narrowing toward the first piece side as it goes to a distal end thereof.

In some exemplary embodiments of the present disclosure, the display main body may further include a fixture slidingly coupled to the coupler and fixed across the fence to prevent separation from the coupler, wherein the fixture is coupled in a state the accommodator and the coupler are fastened.

In some exemplary embodiments of the present disclosure, the coupler may be a protrude piece protruded to correspond to the rail and through which a slit passes in an orthogonal direction from a direction of forming the rail.

In some exemplary embodiments of the present disclosure, the coupler may be at least one protruder protruded to correspond to the hole and through which a slit passes in an orthogonal direction from a lengthwise direction of the fence.

In some exemplary embodiments of the present disclosure, the fixture may include a third piece longer than or equal to the slit, fourth pieces each corresponding to a width of the slit and each discretely formed across the third piece to allow an elastic deformation and an elastic restoration, a fixture piece fixing one end of the third piece and one end of the fourth piece to be fixed at one side of the slit, and a second hook provided at the other end of the fourth piece.

In some exemplary embodiments of the present disclosure, the second hook may be formed with a slope narrowing toward the third piece side as it goes to a distal end thereof.

In another general aspect of the present disclosure, a digital price displayer is provided, the displayer comprising: a bar code scanner recognizing a product by scanning a bar code of the product; a memory storing information of the product; a display device configured to display information of the product stored in the memory; a communication module configured to perform a communication with an ESL (Electronic Shelf Label) server; and a controller configured to transmit the bar code information of the product recognized by the bar code scanner to the ESL server via the communication module, to receive the information of the product from the ESL server and store the information at the memory.

In some exemplary embodiments of the present disclosure, the bar code scanner may be so installed as to scan a bar code of a product arranged on the upper surface of a plane on which the display device is mounted.

In still another general aspect of the present disclosure, a digital price displayer is provided, the displayer comprising: an RFID (Radio-Frequency IDentification) reader configured to read out an RF tag attached to a product; a display device configured to display information of the product; a communication module configured to perform a communication with an ESL (Electronic Shelf Label) server; and a controller configured to transmit tag information of the product recognized by the RFID reader to the ESL server via the communication module, to receive the product information of the tag from the ESL server and display the information on the display device.

In some exemplary embodiments of the present disclosure, the displayer may further include a memory configured to store information of the product, wherein the display device may output information of the product stored in the memory, and the controller may store the product information of the tag transmitted from ESL server in the memory.

In still further general aspect of the present disclosure, an ESL system is provided, the ESL system comprising: a digital price displayer configured to read out information recorded on a tag attached to a product and transmit the information; and an ESL server configured to receive the information transmitted from the digital price displayer and to transmit information corresponding thereto to the digital price displayer, wherein the digital price displayer may include a tag read-out module configured to read out information recorded on a tag attached to a product, a display device configured to display the information of the product, a first communication module configured to perform a communication with the ESL server, and a first controller configured to transmit the tag information of the product read out by the tag read-out module to the ESL server via the first communication module, to receive the product information of the tag from the ESL server and display the information on the display device, and wherein the ESL sever may include a second communication module configured to perform a communication with the digital price displayer, a memory configured to store the information of the product, and a second controller configured to retrieve the product information of the tag from the memory and transmit the information to the digital price displayer if the tag information is received from the digital price displayer via the second communication module.

In some exemplary embodiments of the present disclosure, the second controller of the ESL server may record in the memory a relationship between the digital price displayer that has transmitted the tag information and the product of the tag.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The suffixes 'module' and 'unit' may be used for elements in order to facilitate the disclosure. Significant meanings or roles may not be given to the suffixes themselves and it is understood that the 'module' and 'unit' may be used together or interchangeably. The term "providing (provide, provided)" may encompass such terms as "generating (generate, generated)", and "producing (produce, produced)".

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. Acronyms are used extensively throughout the description to avoid excessively long descriptive phrases. The meaning will be clear from the context of the description.

Figure 1:
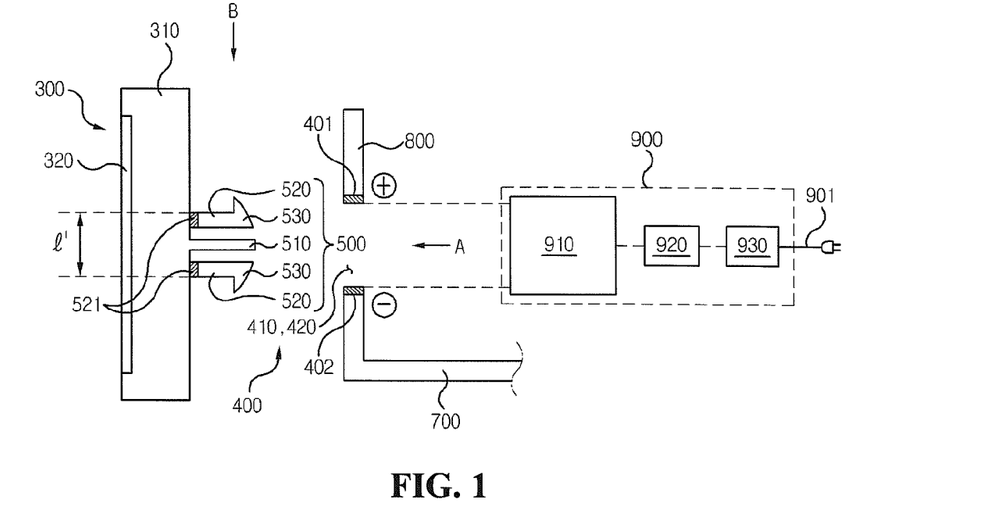
FIG. 1 is a conceptual diagram illustrating a coupled relationship of a digital price displayer according to an exemplary embodiment of the present disclosure.
Figure 2:
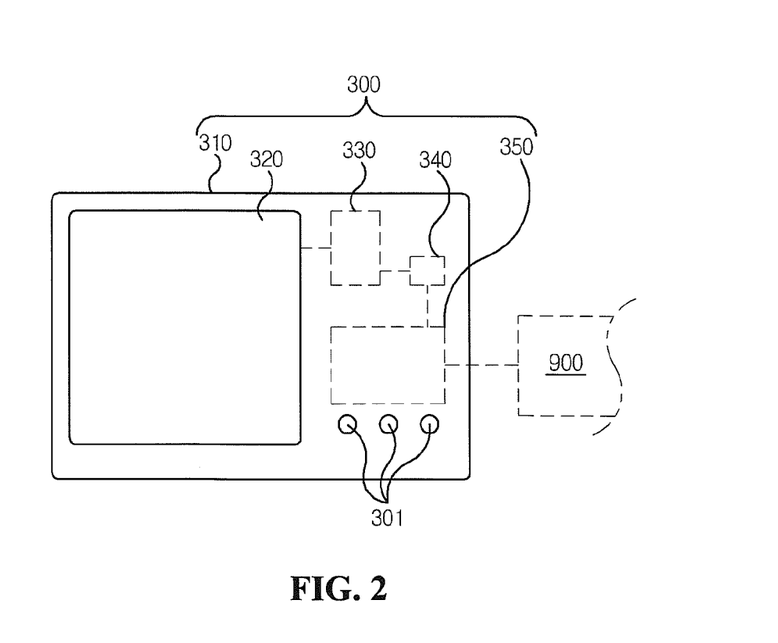
FIG. 2 is a conceptual diagram illustrating a display main body which is a core section of the present invention according to an exemplary embodiment of the present disclosure.
Figure 3:
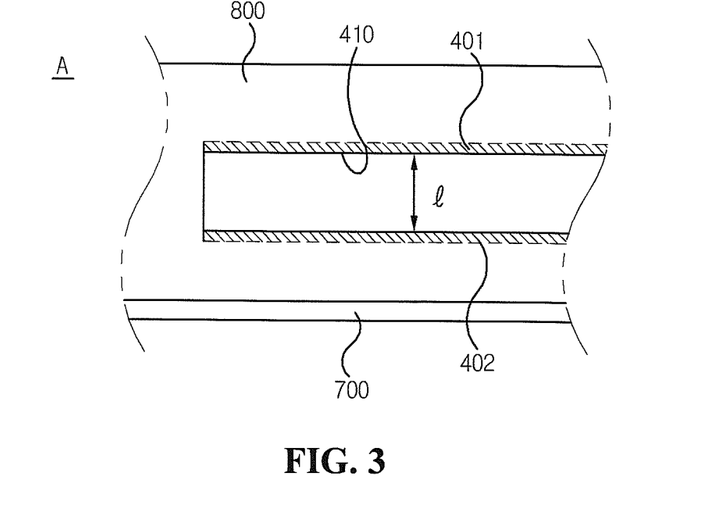
FIGS. 3 and 4 are conceptual diagrams illustrating various exemplary embodiments of accommodator which is a core section of the present disclosure.
Figure 4:
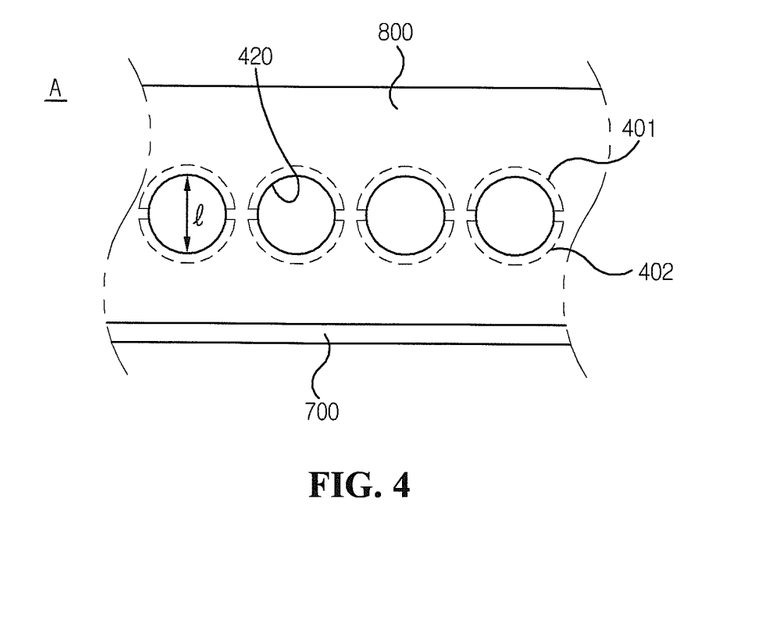
Figure 5:
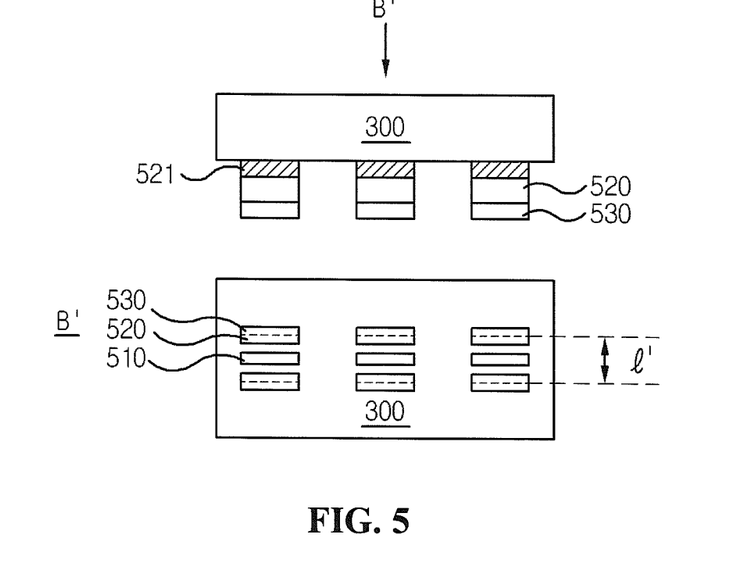
FIGS. 5 and 6 are conceptual diagrams illustrating various exemplary embodiments of coupler which is a core section of the present disclosure.
Figure 6:
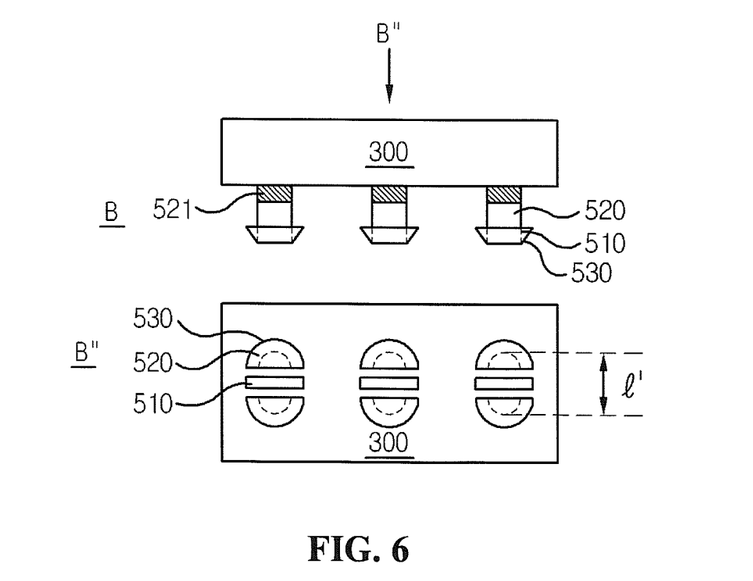

FIG. 1 is a conceptual diagram illustrating a coupled relationship of a digital price displayer according to an exemplary embodiment of the present disclosure, FIG. 2 is a conceptual diagram illustrating a display main body which is a core section of the present invention according to an exemplary embodiment of the present disclosure, FIGS. 3 and 4 are conceptual diagrams illustrating various exemplary embodiments of accommodator which is a core section of the present disclosure, and FIGS. 5 and 6 are conceptual diagrams illustrating various exemplary embodiments of coupler which is a core section of the present disclosure.

The digital price displayer according to the present disclosure may include a display main body 300 fixed to a shelf, an accommodator 400 provided at a fence 800 and a coupler 500 provided at display main body 300.

A power supplier 900 may supply an electric power to the display main body 300 (described later in detail) by being mounted at one side of the shelf 700 on which products are displayed.

The display main body 300 attachably and detachably coupled to the shelf 700 is charged by the power supplied from the power supplier 900 to allow prices, specifications and advertisement images of the products displayed on the shelf 700 to be displayed. The display main body 300 also provides a space for the coupler 500 (described later).

The accommodator 400 is formed at one side lengthwise of the shelf 700 with an anode 401 and at the other side with a cathode 402 for the display main body 300 to be electrically connected to the power supplier 900 if the display main body 300 is fixed to the accommodator 400. The accommodator 400 may use what is on existing facilities such as an existing shelf or an assembled angle.

A coupler 500 is provided at the display main body 300 to be slidingly coupled with the accommodator for electrical connection with the anode 401 and the cathode 402 and to prevent from being separated from the accommodator. That is, the coupler 500 may be easily coupled to the accommodator 400 but structurally needs an additional separating tool for being separated from the accommodator 400.

The present disclosure may be implemented and applied based on the above-mentioned configuration, and in order to describe other exemplary embodiments of the present disclosure, description to each of the following essential elements will be given.

First of all, the shelf 700 may be installed with a fence 800 to fix the display main body 300 to the accommodator 400, and the accommodator 400 may be formed lengthwise of the fence 800. The fence 800 may be mounted along a margin of the shelf 700 on which the products (not shown) are arranged, and provide a space for the accommodator 400 and a space for the display main body 300 so that the products should not be dropped from the shelf 700.

The power supplier 900 that supplies a power to the display main body 300 may include a charger 910 and an overload preventing circuit 920. The charger 910 may electrically connect the anode 401 and the cathode 402 mounted across the accommodator 400 to an outside power line 901. The overload preventing circuit 920 may be mounted between the outside power line 901 and the charger 910 to prevent the charger 910 from being damaged by an overload. A DC adapter 930 may be further provided between the overload preventing circuit 920 and the outside power line 901 for converting AC (Alternating Current) supplied from the outside power line 901 to DC (Direct Current).

Therefore, the power supplier 900 can continuously supply a power to the display main body 300 while being connected to the outside power line 901, and simultaneously charge an operating power of the display main body 300 to the charger 910. Furthermore, the power supplier 900 can supply a power to the display main body 300 mounted at the fence 800 until the charged operation power is consumed if power supply is interrupted due to blackout or failure of the outside power line.

The display main body 300 may receive prices, specifications and advertisement images of the products displayed on the shelf via a server (not shown) through a wired or wireless network. The display main body 300 may be connected to the server through the wired or wireless network to additionally mount a small-sized image cam or a detection sensor so that stocks of a relevant product or a position of a product to be sought after can be easily grasped.

To this end, as shown in FIG. 2, the display main body 300 may include a body 310, a display module 320, a communication module 330, an MPU (Micro Processor Unit) 340 and a charger 350, where an unmarked reference numeral 301 is a manipulating button.

The body 310 which is fixed at the fence 800 may provide a space for embedding the display module 320, the communication module 330, the MPU 340, and the charger 350 (described later).

The display module 320 may be embedded in the body 310 to provide a screen configured to change and output prices, specifications and advertisement images of products arranged on the shelf 700. The communication module 330 may be embedded in the body 310 to receive the prices, specifications and advertisement images of products arranged on the shelf 700 from the server via the wired or wireless network and transmit to the display module 320.

The MPU 340 may be embedded in the body 310 to control a screen output of the display module 320 and the communication with the communication module 330 and to perform a series of calculations resultant from transmission and receipt of an amount of information processed by the screen output process and the communication process.

The charger 350 may be embedded in the body 310 to be electrically connected to the power supply 900 in a case the body 310 is fixed at the fence 800, and supply a power for driving the display module 320, the communication module 330 and the MPU 340.

The accommodator 400 may be a slit-shaped rail 410 formed along a lengthwise direction of the fence 800 or a plurality of holes 420 formed along a lengthwise direction of the fence 800, where the rail 410 may be coupled with the coupler 500 (described later) having a corresponding shape as shown in FIG. 5 or the coupler 500 having a corresponding shape as shown in FIG. 6.

At this time, the rail 410 may be provided at one side with the anode 401 and at the other side with the cathode 402 along a lengthwise direction of the fence 800, and a hole 420 is provided at one marginal side with the anode 401 and the other marginal side with the cathode 402. The fence 800 is entirely isolated with an insulating material to prevent a user from receiving an electric shock due to carelessness except for a portion where the anode 401 and the cathode 402 are coupled with the coupler 500 (described later).

The coupler 500 may be easily coupled with the accommodator 400 but have a configuration in which it is difficult to separate the coupler 500 from the accommodator 400, that is, the fence 800 without a separate tool, and may be formed with a first piece 510, a second piece 520 and a first hook 530.

The pin-shaped first piece 510 may be accommodated into the accommodator 400, i.e., the rail 410 or the holes 420, to function as a framework of the coupler 500. Each of the second pieces 520 may be discretely formed at each side of the first piece 510 to correspond to a width (l) of the accommodator, to allow an elastic deformation and an elastic restoration, where an entire length (l') toward the first piece 510 from each outside of the second pieces 520 may be equal to the width (l).

The first hook 530 may be provided at a distal end of the second piece 520 and may be formed with a slope narrowing toward the first piece 510 as it goes to a distal end thereof to be slidingly hitched by the accommodator 400 and to prevent the display main body 300 from being separated, where the outside of the second piece 520 is provided with an electrode terminal 521 contacting the anode 401 and the cathode 402 to be electrically connected to the power supplier 900 in a case the coupler 500 is inserted into and coupled with the accommodator 400.

Figure 7:
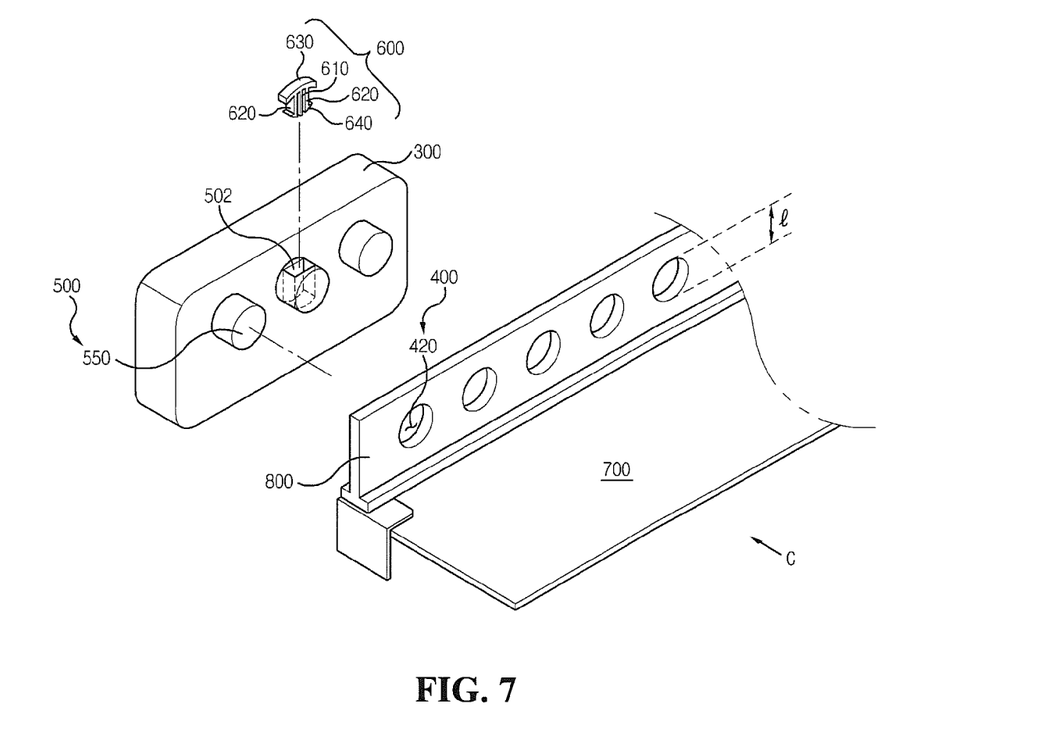
FIG. 7 is an exploded perspective view illustrating a coupled relationship of a digital price displayer according to another exemplary embodiment of the present disclosure.
Figure 8:
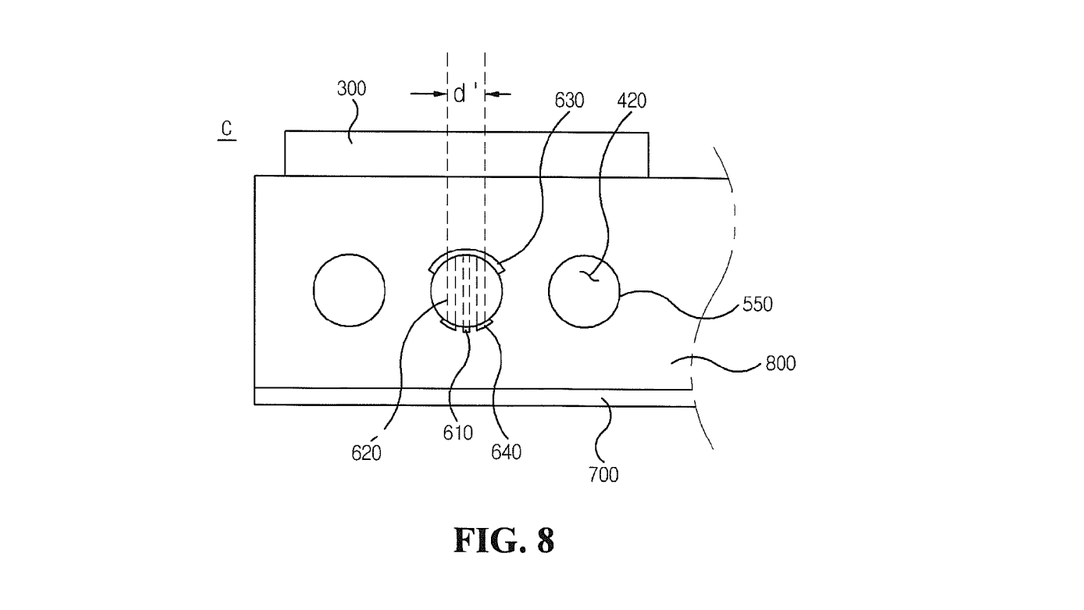
FIG. 8 is a rear surface conceptual diagram illustrating a coupled relationship of a digital price displayer according to another exemplary embodiment of the present disclosure.

The digital price displayer according to the present disclosure may be applied with another exemplary embodiment as shown in FIGS. 7 and 8.

FIG. 7 is an exploded perspective view illustrating a coupled relationship of a digital price displayer according to another exemplary embodiment of the present disclosure, and FIG. 8 is a rear surface conceptual diagram illustrating a coupled relationship of a digital price displayer according to another exemplary embodiment of the present disclosure.

Referring to FIGS. 7 and 8, the digital price displayer may include a fence 800 provided on the shelf 700, the display main body 300 fixed at the fence 800, the accommodator 400 provided at the fence 800, the coupler 500 provided at the display main body 300 and a fixture 600 fixing the accommodator 400 with the coupler 500. The fence 800, the display main body 300 and the accommodator 400 are similar to those described in the first exemplary embodiment, such that explanation thereto is omitted for convenience sake.

For reference, reference numerals not shown in FIGS. 7 and 8 may be referred to those in FIGS. 1 through 6, and it should be noted that the accommodator 400 illustrated in FIGS. 7 and 8 refers to the holes 420, and the coupler 500 refers to a protrude 550.

The anode 401, the cathode 402 and the electrode terminal 521 are omitted in FIGS. 7 through 10 for convenience sake, and the detailed coupled relationship among the anode 401, the cathode 402 and the electrode terminal 521 should be referred to FIGS. 1 through 6.

Figure 9:
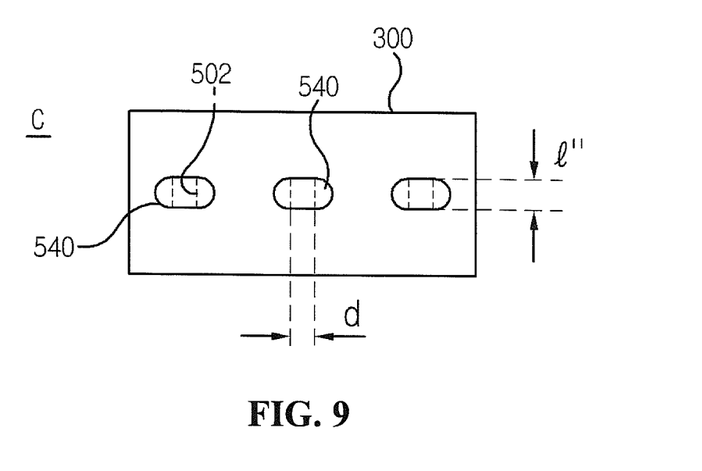
FIGS. 9 and 10 are conceptual diagrams illustrating various exemplary embodiments of coupler which is a core section of the present disclosure.
Figure 10:
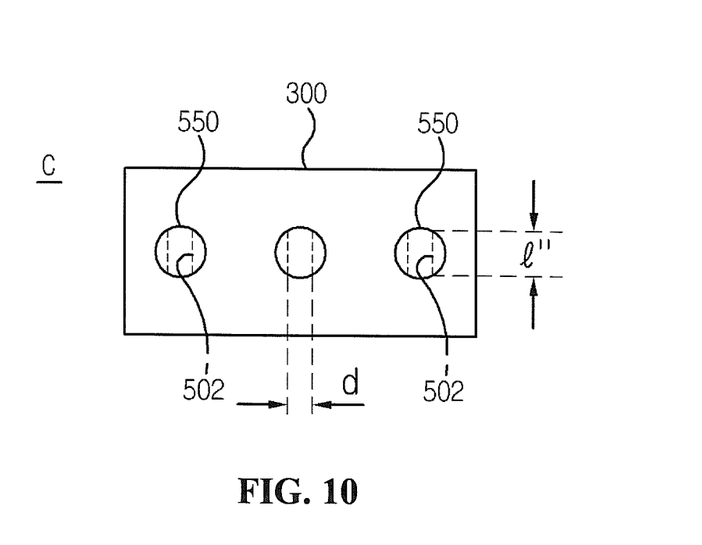

The coupler 500, which is the protrude 550, is provide at the display main body 300 to be accommodated into the accommodator 400, i.e., the hole 420, and may be a protruder piece 540 of FIG. 9, or the protruder 550 of FIG. 10.

One or more protrude pieces 540 may be a protruder or protruders from the display main body 300 to correspond to the rail 410 of FIG. 3 and through which a slit 502 passes in an orthogonal direction from a direction of forming the rail 410.

At least one or more protruders 550 are protruded from the display main body 300 to correspond to the hole 420 and through which a slit 502 passes in an orthogonal direction from a lengthwise direction of the fence 800, where each width (l") of the protrude piece 540 and the protrude 550 correspond to the width (l) of the accommodator 400.

The fixture 600 may be slidingly coupled with the coupler 500 to prevent from being separated from the coupler 500, both ends of which are fixed to fence 800. Wherein the fixture 600 is coupled in a state the accommodator 400 and the coupler 500 are fastened. The fixture 600 may include a third piece 610, a fourth piece 620, a fixture piece 630 and a second hook 640. The third piece 610, equal to or longer than the slit 502, may function as a center and a framework for being inserted into the slit 502.

The fourth pieces 620 each corresponding to a width (d) of the slit 502 and each discretely formed across the third piece 610 to substantially form a predetermined distance (d') and to allow an elastic deformation and an elastic restoration for insertion into and fixed at the slit 502. The width (d) and the distance (d') are equal.

The fixture piece 630 fixing one end of the third piece 610 and one end of the fourth piece 620 to be hitched by and fixed at one side of the slit 502.

The second hook 640 is provided at the other end of the fourth piece 620, and is formed with a slope narrowing toward the side of the third piece 610 as it goes to a distal end thereof. The second hook 640 is slidingly coupled through the slit 502 to allow an elastic deformation and an elastic restoration of the fourth piece 620 and to prevent separation from the coupler 500.

As apparent from novel idea of the digital price displayer according to the present disclosure, a sales manager is easily enabled to grasp stocks and sales status of products, and the digital price displayer can be easily attached to or detached from the shelf on which the products are arranged, whereas customers are given difficulty in separating the digital price displayer.

Figure 11:
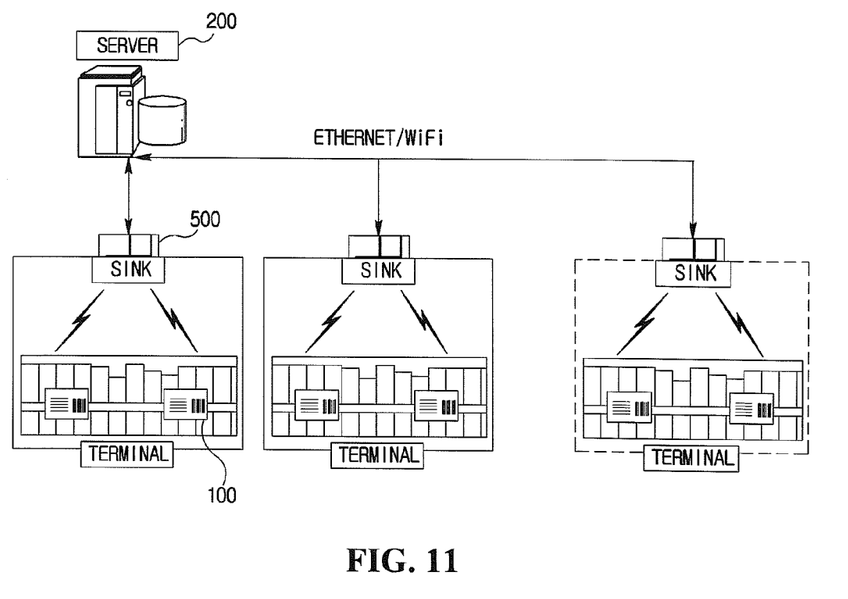
FIG. 11 is a conceptual diagram illustrating a schematic configuration of an ESL system according to an exemplary embodiment of the present disclosure.

FIG. 11 is a conceptual diagram illustrating a schematic configuration of an ESL system according to an exemplary embodiment of the present disclosure.

Referring to FIG. 11, the ESL system may include an ESL server 200 storing and distributing data for product management, and a digital price displayer 100 receiving the product information from the ESL server 200 and displaying the information. The digital price displayer may be installed at a good place of a stand on which products are arranged for the customers to look at, and display information (e.g., product name and price) of the product arranged on the nearby stand.

The ESL server 200 and the digital price displayer 100 may form a communication channel via a relay 500. The ESL server 200 and the relay 500 may be connected to a wired network including Ethernet or a wireless network including wi-fi. The relay 500 and the digital price displayer 100 may be connected to the wireless network such as wi-fi and Bluetooth®.

Figure 12:
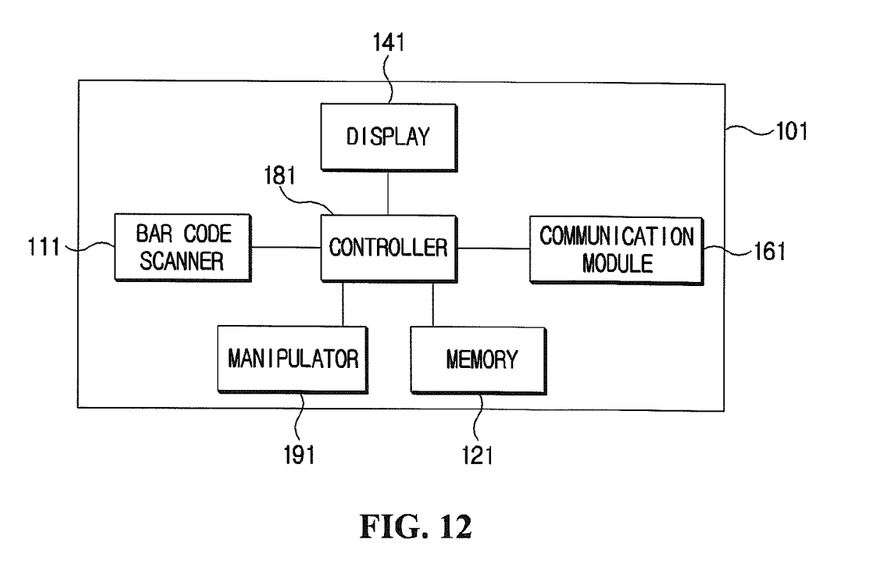
FIG. 12 is a block diagram illustrating a digital price displayer according to another exemplary embodiment of the present disclosure.

FIG. 12 is a block diagram illustrating a digital price displayer according to another exemplary embodiment of the present disclosure.

Referring to FIG. 12, a digital price displayer 101 may include a bar code scanner 111, which is a product tag readout module, recognizing a product by scanning a bar code of the product, a memory 121 storing information of the product, a display device 141 configured to display information of the product stored in the memory 121, a communication module 161 configured to perform a communication with an ESL (Electronic Shelf Label) server 200 (see FIG. 11), and a controller 181 configured to transmit the bar code information of the product recognized by the bar code scanner 111 to the ESL server 200 via the communication module 161, to receive the information of the product from the ESL server 200 and store the information at the memory 121. Meanwhile, the digital price displayer 101 may further include a manipulator 191 receiving a manager instruction whereby the product information can be inputted.

The display device 141 may be a device including an LCD, a PDP, an LED and a CRT.

The bar code scanner 111 may be implemented in various manners. For example, the bar code scanner 111 may be so installed as to scan a bar code of a product arranged on the upper surface of a plane on which the display device 141 is mounted, which is designed to make it easy for a price display surface to face the product when the bar code on the product is to be recognized, because the price display surface of the price displayer generally faces a direction which is convenient to the user.

The bar code scanner 111 may take a shape in which the main body of the digital price displayer 101 is independently formed, and connected by a coil-type conductor wire.

The communication module in the ESL server 200 of FIG. 11 may communicate with the digital price displayer 101 (reference numeral 100 in FIG. 11) via a separate relay 500. In a case the relay 500 supports a short distance wireless communication such as Bluetooth® and Zigbee, the communication module 161 of the digital price displayer 101 may be a short distance communication module.

Furthermore, in a case the ESL server 200 and the digital price displayer 101 are directly connected to a wired network such as Ethernet, the communication module 161 of the digital price displayer 101 may be a wired network LAN (Local Area Network) card.

The manipulator 191 may receive an instruction by a store manager to allow the digital price displayer 101 to perform a work of inputting product information. A keypad of the manipulator 191 may be implemented by a user interface device.

The controller 181 may control operations of an entire element of the digital price displayer 101. In a case the manipulator 191 receives an input instruction on the product information, the controller 181 may perform a product information display method as shown in FIG. 13.

Figure 13:
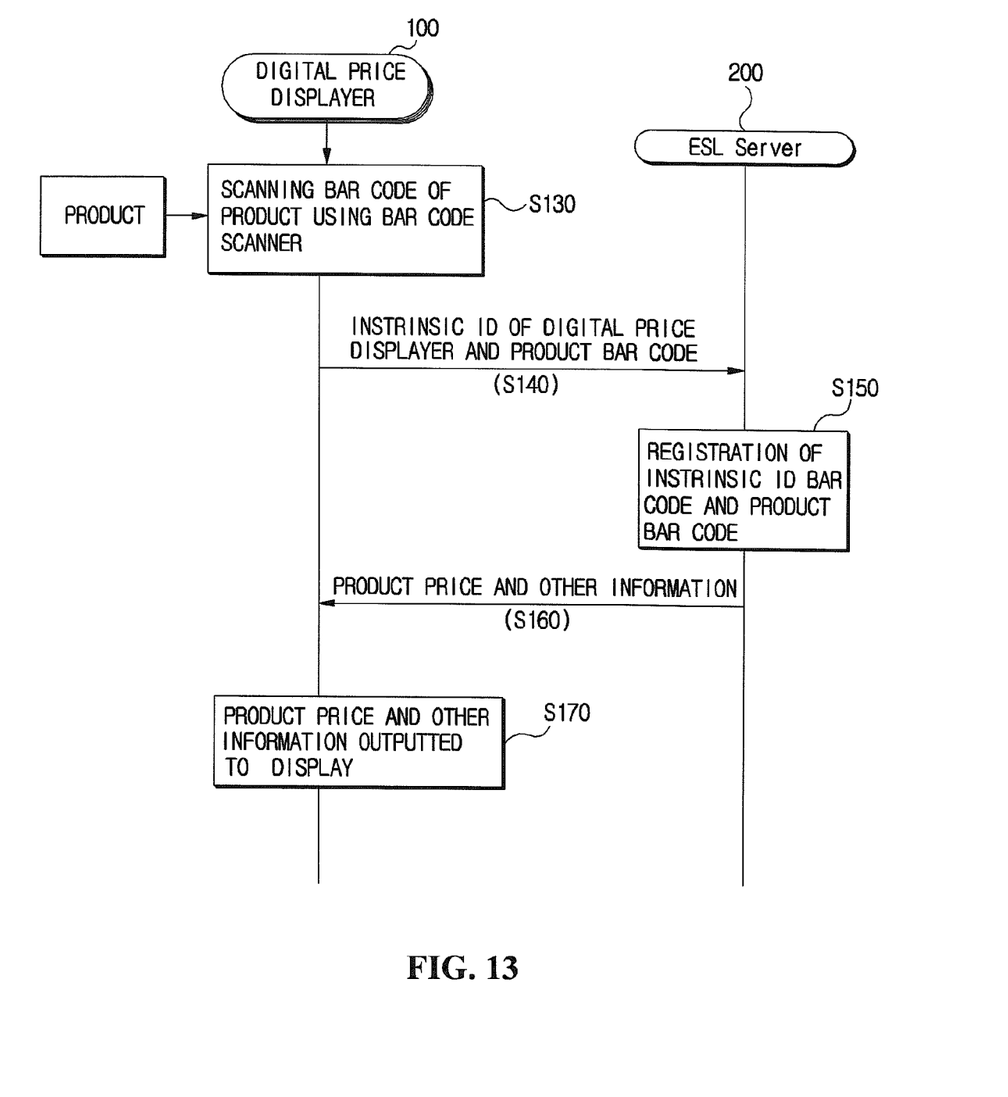
FIG. 13 is a flowchart illustrating a product information display method in an ESL system including a digital price displayer of FIG. 12.

The product information display method illustrated in FIG. 13 may include recognizing, by a bar code scanner of the digital price displayer 100, a bar code of a product (S130), transmitting, by the digital price displayer 100, the recognized bar code information to the ESL server 200 (S140), receiving, by the ESL server 200, the bar code information to register the digital price displayer 100 and a product (S150), transmitting, by the ESL server 200, the information of the registered product to the registered digital price displayer 100 (S160), and displaying the received product information by the digital price displayer 100 (S170).

The step S130 resembles a product bar code input process using a conventional bar code recognition terminal. In a case a store manager holds a product arranged (or to be arranged) on a nearby arrangement area of the digital price displayer 100, and scans the bar code attached on the product using the bar code scanner of the digital price displayer 100, the step S130 is implemented.

In step S140, the digital price displayer 100 may transmit the recognized bar code information of the product and the identification information (e.g., ID) of the digital price displayer 100 to the ESL server 200 using the wireless communication network.

In step S150, the ESL server 200 may record a product to be displayed on a relevant digital price displayer 100 and the identification information (e.g., ID) of the digital price displayer 100 in an inner database.

In step S160, information (e.g., product name and price) of a product to be displayed on a relevant digital price displayer 100 may be transmitted to each registered digital price displayer 100.

In step S170, the digital price displayer 100 may store the transmitted information of product in the inner memory, and display on the display device the information (e.g., product name and price) of a product displayed (or to be displayed) at a nearby arranged area.

The store manager manipulating the digital price displayer 100 may display the product information on the digital price displayer 100 in the following processes.

The manager managing the products arranged on the stand mounted with a plurality of digital price displayers 100 may scan the products arranged (or to be arranged) at a nearby arrangement area using the bar code scanner 111 of each digital price displayer 100. As a result, the digital price displayer 100 may perform the steps S130 and S140.

Successively, the ESL server 200 may perform the steps S150 and S160, and the digital price displayer 100 may perform the S170, whereby the digital price displayer 100 is displayed with product name and price of the product arranged on the nearby arrangement area.

As expounded in the foregoing, according to the product information display method, the cumbersomeness of the manager personally inputting product information can be prevented to effectively perform the product information input process.

Figure 14:
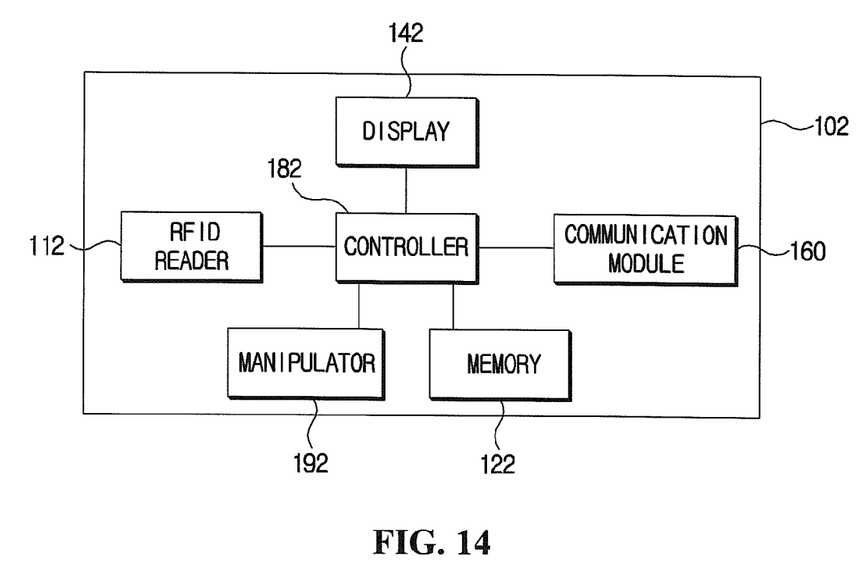
FIG. 14 is a block diagram illustrating a digital price displayer according to still another exemplary embodiment of the present disclosure.

FIG. 14 is a block diagram illustrating a digital price displayer according to still another exemplary embodiment of the present disclosure.

Referring to FIG. 14, a digital price displayer 102 may include an RFID (Radio-Frequency IDentification) reader 112 configured to read out an RF tag attached to a product, a memory 122 storing the product information, a display device 142 configured to display information of the product stored in the memory 122, a communication module 160 configured to perform a communication with an ESL (Electronic Shelf Label) server 200 (see FIG. 11), and a controller 182 configured to transmit tag information of the product recognized by the RFID reader 112 to the ESL server 200 via the communication module 160, to receive the information of the product from the ESL server 200 and store the information on the memory 122.

The digital price displayer 102 may further include a manipulator 192 configured to receive an instruction of a manager for inputting the product information.

The RFID reader 112 may be implemented in various manners. For example, the RFID reader 112 may be so installed as to scan an RFID tag of a product arranged on the upper surface of a plane on which the display device 142 is mounted. To be more specific, a ring-shaped loop antenna of the RFID reader 112 may be arranged at an edge of the display device 142, which is designed to make it easy for a price display surface to face the product when the RFID tag on the product is to be recognized, because the price display surface of the price displayer generally faces a direction which is convenient to the user.

The RFID reader 112 may take a shape in which the main body of the digital price displayer 101 is independently formed, and connected by a coil-type conductor wire. The memory 122, the display device 142 and the communication module 162 are identical in structure thereof with those in FIG. 12, such that there will be no further repetitive explanation thereto.

The controller 182 may perform an operation similar to that of the controller in FIG. 12, but may further perform an additional service using the characteristics of RFID which has a broader recognition scope than that of the bar code. For example, in a case the product information (e.g., product name and price) is displayed by the digital price displayer 102, and an RFID of a product that does not match the product information displayed through the RFID reader 112 is detected for a predetermined period of time, the detection may be transmitted to the ESL server 200. This has an advantage of advising the mismatched information to the store manager and allowing it to be corrected, in a case a product arranged on the stand is displaced or misplaced by another product due to mistakes of the manager or the customer. The controller 182 may perform a product information display method as shown in FIG. 15.

Figure 15:
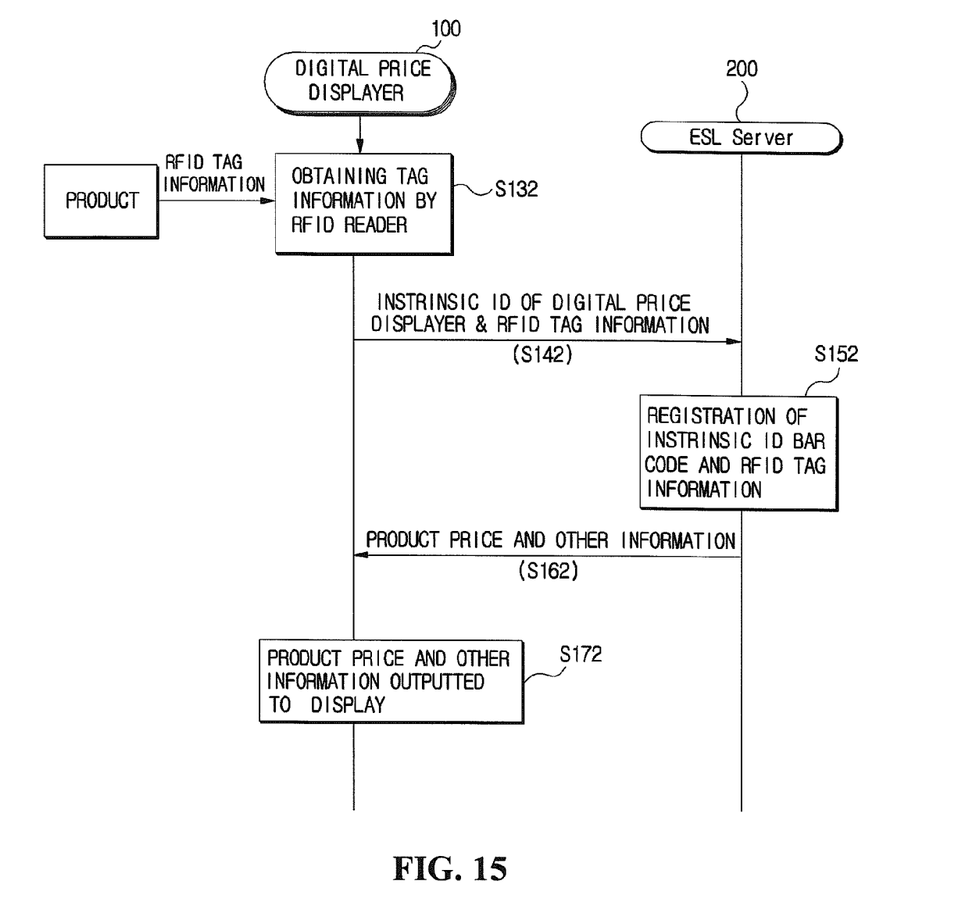
FIG. 15 is a flowchart illustrating a product information display method in an ESL system including a digital price displayer of FIG. 14.

A product information display method illustrated in FIG. 15 may include reading out, by the RFID reader of the digital price displayer 100, a RFID tag attached to a product (S132), transmitting, by the digital price displayer 100, the read-out tag information to the ESL server 200 (S142), receiving, by the ESL server 200, the tag information to register the digital price displayer 100 and the product (S152), transmitting, by the ESL server 200, the information of the registered product to the registered digital price displayer 100 (S162), and displaying the received product information by the digital price displayer 100 (S172).

The step S132 resembles a product bar code input process using a conventional bar code recognition terminal.

In a case a store manager positions a product arranged (or to be arranged) on a nearby arrangement area of the digital price displayer 100 at a read-out area of the RFID reader of the digital price displayer 100, the step S132 is implemented.

In step S142, the digital price displayer 100 may transmit the recognized tag information of the product and the identification information (e.g., ID) of the digital price displayer 100 to the ESL server 200 using the wireless communication network.

In steps S152 through S172 are identical as those in FIG. 13, such that no repetitive explanation will be given.

Figure 16:
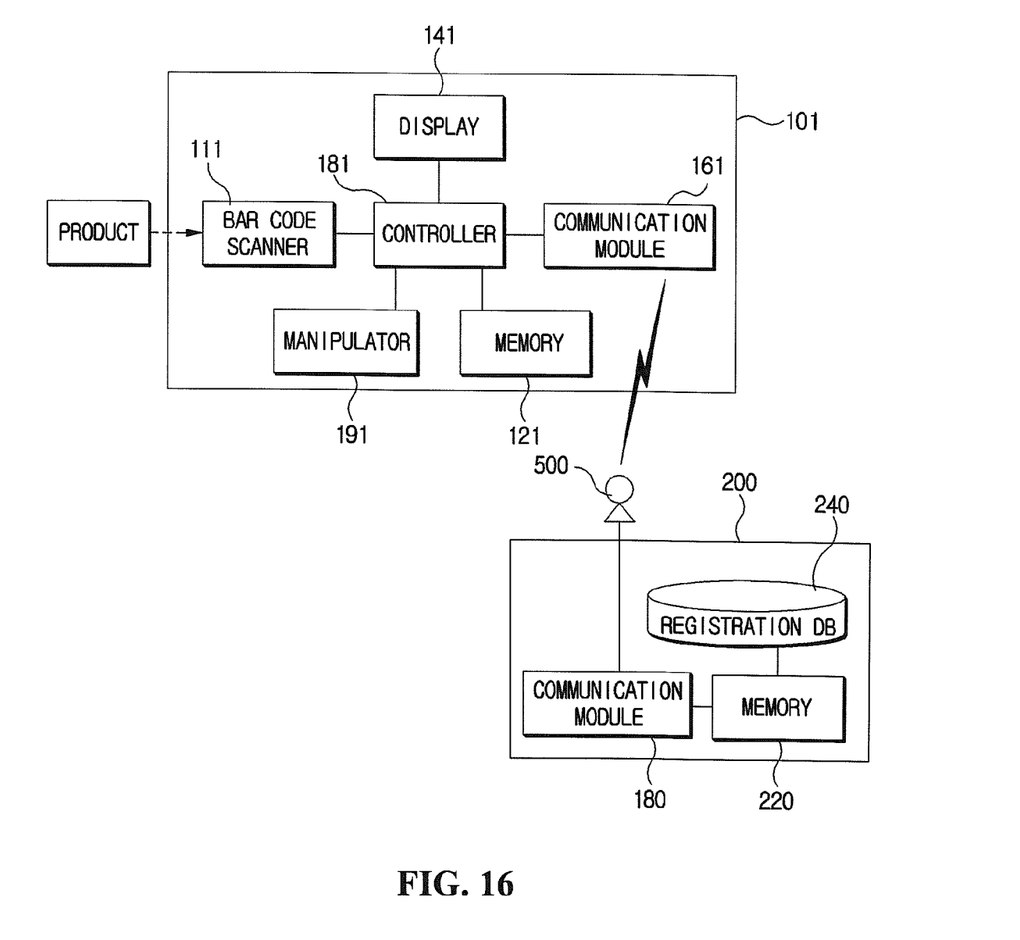
FIG. 16 is a block diagram illustrating an ESL system consisting of a digital price displayer and an ESL server according to an exemplary embodiment of the present disclosure.

FIG. 16 is a block diagram illustrating an ESL system consisting of a digital price displayer and an ESL server according to an exemplary embodiment of the present disclosure.

Referring to FIG. 16, the ESL system may include a digital price displayer 101 mounted with a tag read-out module for reading out information recorded in a tag attached to a product, an ESL server 200, and a relay 500.

The digital price displayer 101 may include a bar code scanner 111 as a tag read-out module, a display device 141 configured to display information of the product, and a communication module (first communication module) 161 configured to perform a communication with the ESL server 200, and a controller (first controller) 181 configured to transmit tag information read out by the bar code scanner 111 to the ESL server 200 via the communication module (the first communication module) 161, receive the product information of the tag from the ESL server 200, and display the product information on the display device 141.

The ESL server 200 may include a communication module (second communication module) 180 performing a communication with the digital price displayer 101, a registration database 240 as a memory in which information of an arranged product and the digital price displayer 101 is recorded, a controller (second controller) 220 configured to receive the ID information of the digital price displayer 100 and tag information of arranged product from the digital price displayer 101 via the communication module (second communication module) 180 and to register the same on the registration database 240. At this time, the controller (second controller) 220 may record in the registration database 240 (as a memory) a relationship between the digital price displayer 101 that has transmitted the tag information and the product of the tag.

The communication module 180 of the ESL server 200 may perform the communication with the digital price displayer 101 via a separate relay 500. In a case the ESL server 200 and the relay 500 are connected via Ethernet such as a wired network, the communication module 180 may be a wired network LAN card.

Although the present disclosure has been described in terms of exemplary embodiments, the embodiments disclosed in this application are to be considered in all respects as illustrative and not limiting. It should be appreciated that variations may be made in the embodiments described by persons skilled in the art without departing from the scope of the present invention as defined by the following claims. For example, the persons skilled in the art would easily understand that the display main body according to the exemplary embodiments of the present disclosure is not limited to price and product information but can be variably applied to a place where a third person cannot easily separate the coupled relationship although it may be easily coupled by a manager when a lots of products are needed to be arranged in a neat manner, such as a library or a storage where a simple title or information are needed.

The scope of the disclosure is indicated by the appended claims rather than by the foregoing description, and all modifications or changes that come within the meaning and range of equivalency of the claims are intended to be embraced therein.

What is claimed is:

1. A digital price displayer, comprising:
    a power supplier mounted on a product-displayed shelf for supplying a power;
    a display main body attachable to and detachable from the shelf and receiving power supplied from the power supplier, and outputting a price, a specification and an advertisement image of a product displayed on the shelf;
    an accommodator provided at the shelf, formed at one side with an anode and formed at the other side with a cathode for the display main body to be electrically connected to the power supplier if the display main body is fixed to the accommodator; and
    a coupler provided at the display main body to be slidingly coupled with the accommodator for electrical connection with the anode and the cathode and to inhibit from being separated from the accommodator,
    wherein the coupler comprises:
        a pin-shaped first piece accommodated into the accommodator;
        second pieces each discretely formed at each side of the first piece to correspond to a width of the accommodator to allow an elastic deformation and an elastic restoration; and
        a first hook provided at a distal end of the second piece to be slidingly hitched by the accommodator and to inhibit the display main body from being separated, wherein an outside of the second piece is provided with an electrode terminal contacting the anode and the cathode to be electrically connected to the power supplier.

2. The digital price displayer of claim 1, wherein the shelf is installed with a fence to fix the display main body as the coupler is coupled to the accommodator, wherein the accommodator is formed lengthwise of the fence.

3. The digital price displayer of claim 1, wherein the power supplier comprises:
    a charger electrically connecting the anode, the cathode and an outside power line, and an overload preventing circuit installed between the outside power line and the charger to prevent the charger from being damaged by overload.

4. The digital price displayer of claim 3, further comprising a DC adapter between the overload preventing circuit and the outside power line to convert an AC (Alternating Current) supplied from the outside power line to a DC (Direct Current).

5. The digital price displayer of claim 1, wherein the display main body receives the price, the specification and the advertisement image of the product displayed on the shelf from a sever via a wired network or a wireless network.

6. The digital price displayer of claim 5, wherein the display main body comprises:
    a body fixed at the shelf, a display module embedded in the body to change and output the price, the specification and the advertisement image of the product displayed on the shelf, a communication module embedded in the body to communicate with the server via a wired network or a wireless network, an MPU (Micro Processor Unit) embedded in the body to control a screen output of the display module and communication with the communication module, and a charger embedded in the body to supply a power for driving the display module, the communication module and the MPU.

7. The digital price displayer of claim 2, wherein the accommodator is a slit-shaped rail or a plurality of holes, where the rail or the holes are provided at one side with an anode and at the other side with a cathode along a lengthwise direction of the fence.

8. The digital price displayer of claim 1, wherein the first hook is formed with a slope narrowing toward the first piece side as it goes to a distal end thereof.

9. The digital price displayer of claim 2, wherein the display main body further comprises:
    a fixture slidingly coupled to the coupler and fixed across the fence to prevent separation from the coupler, wherein the fixture is coupled in a state the accommodator and the coupler are fastened.

10. The digital price displayer of claim 9, wherein the coupler may be a protrude piece protruded to correspond to the rail and through which a slit passes in an orthogonal direction from a direction of forming the rail.

11. The digital price displayer of claim 10, wherein the coupler is at least one protruder protruded to correspond to the hole and through which a slit passes in an orthogonal direction from a lengthwise direction of the fence.

12. The digital price displayer of claim 11, wherein the fixture comprises:
    a third piece longer than or equal to the slit, fourth pieces each corresponding to a width of the slit and each discretely formed across the third piece to allow an elastic deformation and an elastic restoration, a fixture piece fixing one end of the third piece and one end of the fourth piece to be fixed at one side of the slit, and a second hook provided at the other end of the fourth piece.

13. The digital price displayer of claim 12, wherein the second hook is formed with a slope narrowing toward the third piece side as it goes to a distal end thereof.

* * * * *